US010270954B2

(12) United States Patent
Brinkman

(10) Patent No.: US 10,270,954 B2
(45) Date of Patent: Apr. 23, 2019

(54) LED LIGHTING SYSTEM CONTROLLER

(71) Applicant: Jonathan Brinkman, Key Largo, FL (US)

(72) Inventor: Jonathan Brinkman, Key Largo, FL (US)

( * ) Notice: Subject to any disclaimer, the term of this patent is extended or adjusted under 35 U.S.C. 154(b) by 124 days.

(21) Appl. No.: 15/423,545

(22) Filed: Feb. 2, 2017

(65) Prior Publication Data

US 2017/0223254 A1 Aug. 3, 2017

Related U.S. Application Data

(60) Provisional application No. 62/290,404, filed on Feb. 2, 2016.

(51) Int. Cl.

| | |
|---|---|
| ***H04N 5/232*** | (2006.01) |
| ***G08B 5/38*** | (2006.01) |
| ***E05F 7/00*** | (2006.01) |
| ***G08B 29/10*** | (2006.01) |
| ***H05B 33/08*** | (2006.01) |

(52) U.S. Cl.

CPC ........... *H04N 5/23206* (2013.01); *E05F 7/00* (2013.01); *G08B 5/38* (2013.01); *G08B 29/10* (2013.01); *H05B 33/0845* (2013.01); *E05Y 2900/108* (2013.01)

(58) Field of Classification Search

CPC ............ H05N 5/23206; H05B 33/0845; G08B 29/10; G08B 5/38; E05F 7/00; E05Y 2900/108

See application file for complete search history.

(56) References Cited

U.S. PATENT DOCUMENTS

2011/0169419 A1* 7/2011 Matthews .......... H05B 33/0842 315/292

2016/0100465 A1* 4/2016 Prescott .................. A63F 13/22 345/170

* cited by examiner

*Primary Examiner* — David V Bruce

(74) *Attorney, Agent, or Firm* — Allen F. Bennett; Bennett Intellectual Property

(57) ABSTRACT

A LED controller device that regulates one or more light systems affixed to a vehicle access gate. The controller receives inputs from one or more sources and actuates one or more light systems in response to particular signals, or triggers. The controller also monitors and records usage of the light system and may also record usage of other devices acting in concert with the light systems and/or an access gate. A software configuration tool is used to prepare a gate operation profile that identifies triggering events and the actions the controller takes upon the occurrence of the triggering events. That gate operation profile is flashed onto the controller's CPU. The controller may be contacted and controlled remotely or locally.

3 Claims, 2 Drawing Sheets

LED LIGHTING SYSTEM CONTROLLER

CROSS-REFERENCE TO RELATED APPLICATIONS

This application claims priority to U.S. Provisional Application Ser. No. 62/290,404 filed on Feb. 2, 2016, the contents of which are hereby incorporated by reference in their entirety.

STATEMENT REGARDING FEDERALLY SPONSORED RESEARCH OR DEVELOPMENT

Not Applicable.

NAMES OF PARTIES TO A JOINT RESEARCH AGREEMENT

Not Applicable

REFERENCE TO SEQUENCE LISTING, A TABLE, OR A COMPUTER PROGRAM LISTING APPENDIX SUBMITTED ON A COMPACT DISC AND INCORPORATION-BY-REFERENCE OF THE MATERIAL

Not Applicable.

COPYRIGHT NOTICE

Not Applicable

BACKGROUND OF THE INVENTION

Field of Endeavor:

The present invention relates to systems and methods for controlling and maintaining vehicle access gates. More particularly, the invention relates to devices, systems and methods for controlling a lighting system attached to structures like gates, fences, doors, frames, piers, docks, boats, recreational vehicles and the like.

Background Information:

Pivoting vehicle access gates have become commonplace in today's society. Paid parking locations and gated communities have become increasingly common. To control ingress and egress into these places by a vehicle, a pivoting access gate extending from a housing is often used to prevent or grant access to a location. Access gates typically have four positions. In the closed position, the access gate extends horizontally over a vehicle entrance about three or four feet above the ground and blocks access to the location. When entrance is permitted, the access gate pivots upward into a vertical open position. This movement is the second position, referred to herein as the opening position, and the vertical position is referred to herein as the open position. Once a vehicle has passed through it, the access gate translates through the closing position, returning to the closed horizontal position. A counterbalance is often included on one end of an access gate.

In the past, access gates were operated manually by a guard at the entrance. Today it is common for access gates to be automated, requiring no human operator. Persons wishing to enter a restricted parking area actuate the access gate using a radio frequency transmitter, pushing a button, scanning a barcode, swiping a card or key fob next to a signal detecting device or successfully making payment.

Unfortunately, due to their environments, access gates are subject to various hazards. Vehicle operators sometimes hit an access gate with their vehicle. On occasion, an access gate begins to descend into the closed position too soon, striking a vehicle. Severe weather can also damage and access gate. Furthermore, even the most robust equipment will eventually fail. Access gates are often used dozens or even thousands of times a day and various components will wear out.

When an access gate is damaged or dysfunctional, it must be repaired as soon as possible. However, it is often several hours or more before the manager of the access gate system becomes aware of damage.

This is particularly problematic in the evenings. If an access gate ceases to function properly in the nighttime, the damage may not be discovered until the next morning, exposing the location to ingress by unwanted persons at the worst time, in the night.

To reduce the likelihood of damage, reflective material has been added to the exterior of an access gate. More recently, electric lighting systems have also been added. Some lighting systems are controlled such that one or more lights blink while the access gate is moving up or down and may use an alternate pattern when the access gate is fully open or fully closed.

The access gates are also increasingly illuminated by LED lighting. The LED lighting systems may be programmed. For example, an access gate may have a lighting system that will turn green when going up and red when going down (and when fully-down). The (extruded aluminum) access gates have two tracks embedded within them. One or two LED strips are pulled into the access gate's tracks during assembly. The LED strips are typically illuminated 24 hours a day.

While the use of lighting and lighting utilizing different patterns of illumination have improved access gates and reduced the number of accidental collisions, they do not improve the maintenance of the access gates. Damage to an access gate is still not discovered until someone reports the damage or the manager of the access gate notices the damage. Furthermore, once damage is noticed, the source or cause of the damage is not necessarily obvious. Typically, a maintenance crew must be summoned to inspect and repair the access gate. The maintenance crew often has no idea what tools or equipment may be required to repair the damage or of void future occurrences.

In view of the foregoing, there is a need to provide devices, methods and systems of controlling access gates, for example digitally controlling, and access gate and the fencing lighting systems. It is also desirable to provide devices, methods and systems of expeditiously diagnosing damaged or dysfunctional access gates. It is also desirable to provide devices methods and systems for monitoring usage of access gate and their components. It is also desirable to provide devices, methods and systems for improving the control and actuation of access gates in a variety of circumstances.

BRIEF SUMMARY OF THE INVENTION

Accordingly, the primary object of the present invention is to provide a ruggedized, industrial grade LED controller having software specific to the intended purpose for use with access gates, fences, doorways and the like. In addition, it is an object of the invention to provide a LED controller that may be programmed with a customized gate operation profile.

In greater detail, a LED controller device regulates one or more light systems affixed to a vehicle access gate. The controller receives inputs from one or more sources and actuates one or more light systems in response to particular signals, or triggers. The controller also monitors and records usage of the light system and may also record usage of other devices acting in concert with the light systems and/or an access gate. A software configuration tool is used to prepare a gate operation profile that identifies triggering events and the actions the controller takes upon the occurrence of the triggering events. In this manner, different software allows the controller to be usable in many different contexts. The controller may be contacted and controlled remotely, locally over a cloud network or the like.

In one embodiment, a LED controller for an access gate has a logic board for managing logic circuits. One or more power boards manage powered equipment in electrical communication with the logic board. One or more lighting systems are in electrical communication with the logic board. One or more input devices are also in electrical communication with the logic board. A gate operation profile is created and/or selected by a configuration tool and is loaded onto the logic board. The gate operation profile has a list of triggering events and actions to be taken upon the occurrence of the triggering events.

In another embodiment, the logic board of the LED controller is remotely connected to a central receiving station via one-way or two-way communication. In a further embodiment, the LED controller is connected through the internet to a receiving station and a gate operation profile can be installed remotely through the internet connection. In a further embodiment, the LED controller can actuate external devices like an alarm and/or a surveillance camera upon the occurrence of a triggering event.

These and other objects and advantages of the present invention will become apparent from a reading of the attached specification and appended claims. There has thus been outlined, rather broadly, the more important features of the invention in order that the detailed description thereof that follows may be better understood, and in order that the present contribution to the art may be better appreciated. There are features of the invention that will be described hereinafter and which will form the subject matter of the claims appended hereto.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
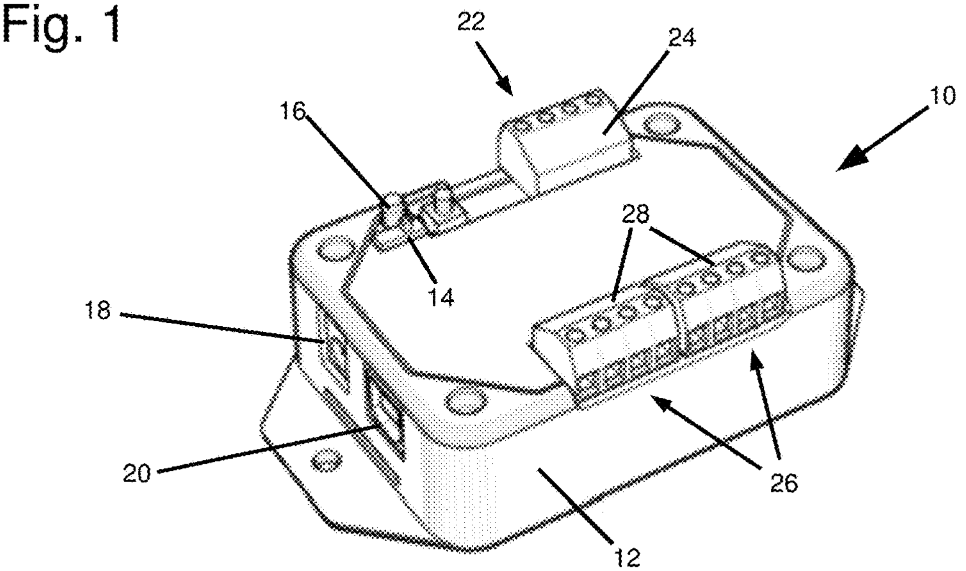
FIG. 1 is a perspective view of an LED controller in accordance with the principles of the invention.

The invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The following detailed description is merely exemplary in nature and is not intended to limit the described embodiments or the application and uses of the described embodiments. All of the implementations described below are exemplary implementations provided to enable persons skilled in the art to make or use the embodiments of the disclosure and are not intended to limit the scope of the disclosure, which is defined by the claims.

Disclosed is a LED controller device that regulates one or more light systems affixed to a vehicle access gate or other device. The LED controller is a programmable system on a chip. The LED controller receives inputs from one or more sources and actuates one or more light systems in response to particular signals, or triggers. The controller may also monitor and record usage of the light system and may also record usage of other devices acting in concert with the light systems and/or an access gate. The LED controller may also provide power to one or more devices.

The LED controller is capable of being pre-programs and reprogrammed using a configuration tool. The configuration tool is software stored on a smart phone, tablets, computer or other device, or optionally accessible via an online portal. The configuration tool is used to create and/or select a runtime version of a software program, or a gate operation profile, which is transferred to the LED controller, thereby programming the controller to perform desired functions upon receiving preselected signals. Once an runtime version of a selected profile has been written using the configuration tool, which is essentially and authoring program, it is compiled into a runtime version of machine code and loaded onto the LED controller device. Transferring a created software profile onto the controller is preferably done via physical electrical communication, such as a USB port, but may also be performed by a Wi-Fi or Bluetooth connection.

The invention also includes the use of a network of LED light controlling modules. A receiving station, such as a computer system at a maintenance station, may receive and record periodic updates from one or more of the LED controller devices in order to monitor the lifespan and durability of different components. The information may also be used to discern which access gates are damaged most frequently, which products are most reliable, which vehicle parking locations are most frequently compromised and other data. The LED controllers provide for more rapid notification of damage or dysfunction by or to an access gate and also provide a maintenance crew with relevant information regarding the types of repairs required. The data collected by the LED controller device may also be used to alert a maintenance crew or manager of a vehicle parking location to information indicating intentional damage, faulty products or improper access.

FIG. 1 shows an LED controller 10 in accordance with the principles of the invention. In this embodiment, the LED controller 10 is housed within a durable casing 12. In this embodiments, the casing 12 is shock resistant and also water resistant. The exterior of the casing 12 includes a toggle power switch 14 that is actuated by switching between two positions. An indicator light 16 is illuminated when the LED controller 10 is turned on. This embodiment of an LED controller 10 also includes a 12 V direct current power port 18. A USB port 20 is used to connect the LED controller 10 to a computer on which the configuring tool is used to prepare a runtime version program to be loaded on the LED controller.

Input ports 22 allows the LED controller 10 to receive signals from external components such as photo electric eyes, garage door actuators or motors, limit switches or other electronic signaling devices. Signals may be received in the form of changes in voltage, dry contacts, opening and closing of circuits and other common electronic signals. In this embodiment, input ports 22 include a press-on header 24. The press-on header 24 ensures a reliable connection between wires from input signaling devices to the input ports 22. In this embodiment, the input ports 22 comprise four separate input pins.

Similarly, the casing 12 also includes one or more output ports 26 for transmitting signals and/or power to one or more output devices such as LED light strips or other light systems. Optionally, the output ports 20 may also be attached to other output devices such as an audio alarm, a video screen or other devices.

The electronic circuits within the LED controller 10 may include a top printed circuit board (PCB) having preinstalled firmware that serves as an operating system. In this embodiment, the USB-version of the Controller contains a Cypress CPU which is flash-programmed via a USB port, connected to a PC, tablet or laptop. The Cypress chip runs firmware specifically designed to function only on the logic board and only to regulate the output signals by the controller in response to input or the gate operation program.

The LED controller 10 may optionally maintain a log of activity conducted by the controller and any malfunctions in auxiliary devices. This information may be transmitted in real-time to a receiving station. Optionally, the controller may include a small storage drive and the record log which may then be sent periodically or may be stored in the local storage drive in the controller. The runtime version software installed on the controller may monitor electrical activity in the circuits in order to detect malfunctions or dysfunctions such as input power failure or brownout, open and close signal failures, active motor problems such as stalling or operational difficulties, passive motor problems such as unusual or floating idle states, entrapment checks, watchdogs and other safety signals, telltale signs that the motor is failing and needs repair or replacement, dislocation or breaking of the access gate, and the like.

When one or more of these or other malfunctions are detected, the controller may send an alert signal to the central receiving station indicating that maintenance is required. The gate operation profile on the controller can also automatically engage other devices upon detecting certain events. For example, when the controller detects that the access gate has been dislocated, removed or broken, it could immediately activate a video camera and its microphone. The video recorded by the camera is then immediately transmitted to the receiving station. Optionally, the controller may also activate an audio alarm and/or klaxon in response to an access gate being dislocated or broken. In one embodiment, the controller sends information relating to activity of the access gate as detected by means of the various input ports to the receiving station.

Another important aspect of the invention is the Configuration Tool. The Configuration Tool is used to select what input signals and LED controller will receive and what output signals it will generate in response to those inputs. The configuration tool 50 is a software authoring program that allows a user to design a gate operation profile having specific functions desired by the user. Because the configuration tool is run on a larger computer, it is not limited by the small size of the LED controller. Thus, an operator can defied very precise output signals. For example, if one of the output devices attached to an LED controller is an addressable LED light strip, a profile can be created that defines a very precise color and blinking patterns in the addressable LED strip. A user may also optionally select a previously prepared profile, or create a new customized profile. A user then selects parameters such as the occurrence of various events that will trigger an action by the LED controller. The user can also select the actions taken for each triggering event. Optionally, a user can also select the light and light patterns created by the light systems upon the occurrence of different events.

A user can also include the recording of a log and the other activities and events recorded. For example, a user can select the time an access gate remains up after it has been activated. The user can also select what triggers may cause the access gate to raise into the open position or drop into the closed position. However, this may be undesirable as it may require substantial additional memory. One of the advantages of the present invention is its ability to operate effectively by utilizing a minimal amount of storage and memory as well as programming.

For example, as explained above, it may be desirable for a user to program the LED controller 10 to actuate red lights to remain constantly on when a gate is in a closed position. The controller 10 may turn off the red lights and actuate yellow lights, in either a steady or blinking pattern, as a gate opens, lifting upward. When an access gate is fully open, the controller 10 may deactivate the yellow lights and activate green lighting. When a gate begins to descend into a closed position, the controller 10 may deactivate the green lights and actuate red lights in a blinking pattern. The gate operation profile may also direct that a video camera be actuated when an access gate sustains a substantial impact or breaks off. The gate operation profile may also direct the controller 10 to send a warning signal if it detects a voltage drop below a predetermined level in the system or detects malfunctions in the motor or other components of a gate assembly.

Once a user has selected all of the desired triggers and desired actions taken when a trigger is encountered, a user generate a runtime version of the software by compiling the authored program directly into machine code. Machine code is then flashed onto the LED Controller through the USB cable. The tool will compile firmware dynamically based on the given profile configuration, minimizing the processing power required. This enhances the security of the system and makes it substantially more difficult to hack or disrupts operation of the LED controller.

By preparing customized gate operation profile software and installing it directly onto the logic board of the controller, a minimal amount of storage capacity is required. Furthermore, the simplicity of the programming minimizes the possibility of undesirable loops in the software or crashing of the system due to conflicting routines. Whenever a gate operation profile is loaded onto the controller, any previous profiles are first automatically wiped off the circuit board.

In other embodiments, the controller's user-section may be wiped remotely and new gate operation profiles may be loaded remotely as well. Optionally, an application on a smart phone may be used to load a new gate operation profile. The use of an access gate controller device and unique gate operation profiles also allows for the collection of substantial amounts of data. This may allow both the access gate owners and those responsible for maintenance to more quickly and accurately identified weaknesses in the access gate system and various components thereof.

A marine variant of the controller device may have a sealed NEMA 4X case that is fully waterproof. The marine variant may include a small control panel that can be mounted on a helm or dashboard. The controller may be used to control LED light strips on a boat or vehicle, and control the LED colors from their helm.

In one embodiment, the LED controller comprises a programmable "system on a chip" and has functionality substantially broader than simply controlling lighting. The LED controller is a programmable device which can be configured by the user to fully control the color and gesture behavior of one or more attached LED strips or other devices to be triggered by timers or external signals. The device may be used to control barrier gate arm lighting colors depending on the state of a gate operator using simple voltage change signals. The LED controller device may also be receptive to any kind of electrical signals, perform advanced lighting effects, work in harsh industrial environments, and operate in high or low voltage installations. The LED controller is a multipurpose programmable safety and recreational device primarily designed to intelligently control lighting and other devices. The LED controller is programmed using highly user configurable software allowing its adaptation into many new markets where currently no programmable lighting devices exist.

The LED controller receives signals from one or more of configurable voltage or dry contact inputs, low and high changes in voltage in both AC and DC circuits, configurable trigger voltages, limit switches, and/or advanced digital signals such as status codes from safety sensors.

The LED controller can output several different signals, including pulse-width modulation outputs, switch external devices on or off, such as for example alarms and/or video cameras, powering support devices directly off output headers in order to programmatically turn them on or off, and advanced addressable LED strips. In addition, the LED controller can detect whether a load has been removed from its outputs.

The LED controller of this embodiment is programmed using a configuration tool on a personal computer removably connected to the LED controller via a USB cord. Optionally, the LED controller can be accessed via a Bluetooth® or other wireless access mechanism.

The LED controller can function on very low voltages and less than 30 mA, suitable for being powered by a battery. The LED controller also can receive signals ranging from using AC and DC voltages as high as 1000 V.

Because the configuration tool operates on a personal computer, it is capable of performing substantially more processing and utilizing substantially more memory than would be available where it constrained to a small mobile device as is commonly found in existing LED controller type products. The configuration tool works in multiple languages, on multiple platforms, and on multiple types of computer devices, such as personal computers, laptops, tablets and smartphones. This additional processing power also allows the configuration tool to take the form of an extremely user-friendly program that allows a person inexperienced in programming to create very sophisticated instructions for an LED controller.

Existing LED controllers typically allow a user to select various colors, color sequences and patterns in which the colors alternate, blinking speeds and other relatively simplistic programs. However, their functionality is limited due to the limited size and capability of the microcontroller in the device. The present invention does not suffer these drawbacks. The configuration tool of the present invention allows a user to select one of several possible preconfigured LED controller profiles, or to create his or her own unique profile. For example, advanced fully addressable LED light strips are capable of being adjusted to produce practically any color on the spectrum. However, more complicated patterns and colors require more complicated and more numerous lines of code. Even with today's microcircuits, it is impractical to store interpreting software and/or compiling software along with various runtime libraries and an operating system and a microcontroller. Because the configuration tool is run on a larger or more robust computer system, it may utilize authoring software design for very unsophisticated "programmers" which it may then interpret and compile a single runtime version from a vast library.

Figure 2:
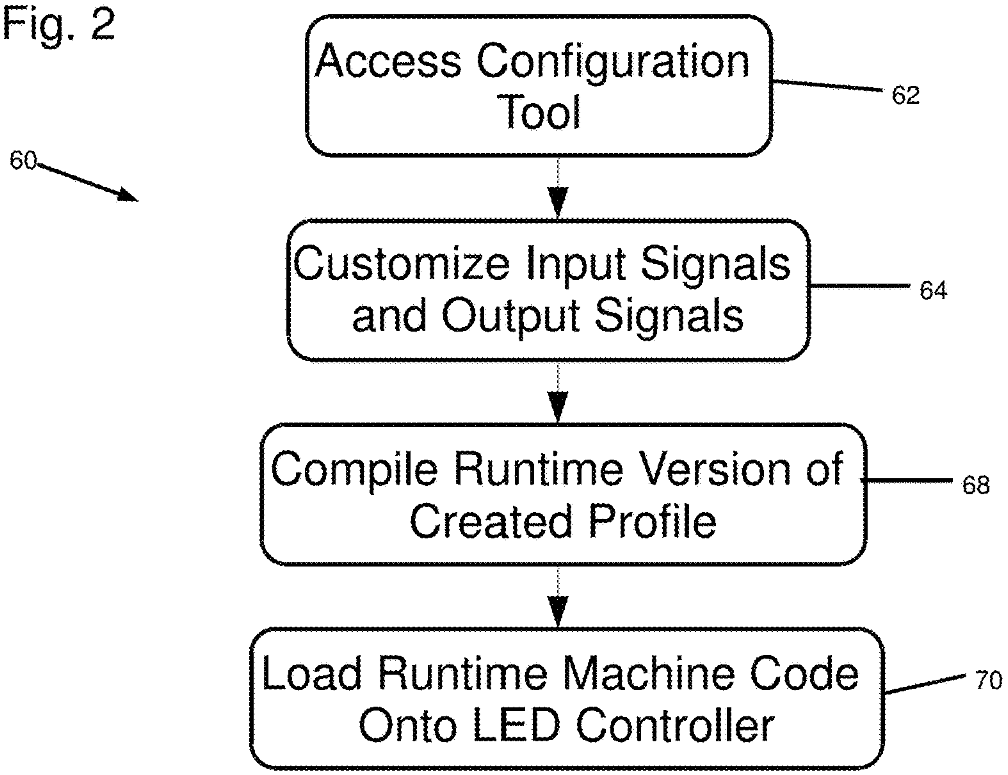
FIG. 2 is a flowchart showing the preparation of an LED controller profile in accordance with the principles of the invention.

FIG. 2 shows a flowchart 60 of a typical method for preparing a runtime version of an LED controller profile in accordance with the present invention. First, a user accesses the configuration tool 62. In this embodiment, the configuration tool is a software program stored on the hard drive of a personal computer. Optionally, the configuration tool may be accessed through an online portal or a different platform. The user then customizes the input signals and output signals 64. The access configuration tool includes a number of profiles for common uses of an LED controller.

EXAMPLE 1

One possible use of an LED controller is to control LED light signals positions around a commercial garage door. In this particular embodiment, a profile is selected for use with the doors of a municipal fire station. The profile is preconfigured to receive signals from a motor that raises and lowers the firehouse garage doors. The profile is also preconfigured to receive signals from a photoelectric eye that detects objects in the doorway when the garage door is open. The profile is also preconfigured to produce light colors and sequences in one or more LED light strips controlled by the output connections of an LED controller. The LED controller to be programmed by the user in this example has three input signal receivers and four output connections. The preconfigured profile provides the following arrangements of input devices and output devices:

TABLE 1

| | |
|---|---|
| Input Receiver 1 | Door Motor |
| Input Receiver 2 | Photoelectric Eye |
| Input Receiver 3 | Unused |
| Output Connection 1 | Outside LED Light |
| Output Connection 2 | Inside LED Light |
| Output Connection 3 | Photoelectric Eye (power) |
| Output Connection 4 | Door Motor (power) |

As may be seen, in this profile the photoelectric eye is supplied power by the LED controller and signals indicating the presence of an object blocking the doorway are also received by the LED controller. Similarly, the door motor is used to provide an input signal and is also powered by one of the output connections. The preconfigured profile is configured to provide the outputs in response to input signals according to this table:

TABLE 2

| Door Position: | LED Light Output: |
|---|---|
| Door Open (from motor) | Solid Green |
| Door in Motion (from motor) | Flashing Red |
| Door Closed (from motor) | Solid Red |
| Door Blocked, Can't Close (from Photoelectric eye) | Flashing White |

In this profile, the LED controller receives signals from the garage door motor indicating the position of the door. The LED controller also receive signals from a photoelectric eye that detects objects in the doorway. The LED controller uses this information to produce the output signals consisting of light colors and flashing patterns. Once the user has selected this preconfigured profile for the LED controller, the user may alter the input or output signals, or may add additional input or output signals. In this example, the user adds additional instructions relating to the photoelectric eye. The first modification is that when the photoelectric eye detects an object blocking the doorway, it flashes white in a very slow pattern. After 20 seconds, if the doorway remains blocked, the lights flash white more quickly. After one minute, the lights flash white very quickly. For the second modification, the user takes advantage of the fact that the LED controller is capable of detecting voltage drops in its output connections, and is capable of selecting different colors for the LED lights to flash. The user adds the instruction that if the third output connection detects a drop in voltage, indicating that the photoelectric eye has ceased to operate, the LED lights will all flash white. The user may optionally select the LED lights to all flash purple when the photoelectric eye stops functioning properly. The user can therefore optionally utilize different colors to signal whether the photoelectric eye is detecting an object blocking the doorway or whether the photoelectric eye is not functioning properly.

Having selected a preconfigured profile, and making personalized adjustments to it, the user may then use the configuration tool to compile a runtime version 68 of the profile generated. The runtime version is compiled into machine code. This further reduces the size requirements for storage on the microcontroller because it eliminates the need for an interpreter or compiler on the microcontroller itself. Another advantage of the present invention is that it allows the microcontroller to maximize the speed at which it operates because it utilizes a minimum of storage and code. This also makes the device substantially more difficult to hack or sabotage.

Once the runtime version has been created, the user may transfer the machine code onto the LED controller 68. This may be done by connecting the LED controller to the computer on which the configuration tool is operating by means of a USB connection. Other connections, such as wireless connections may be utilized.

Figure 3:
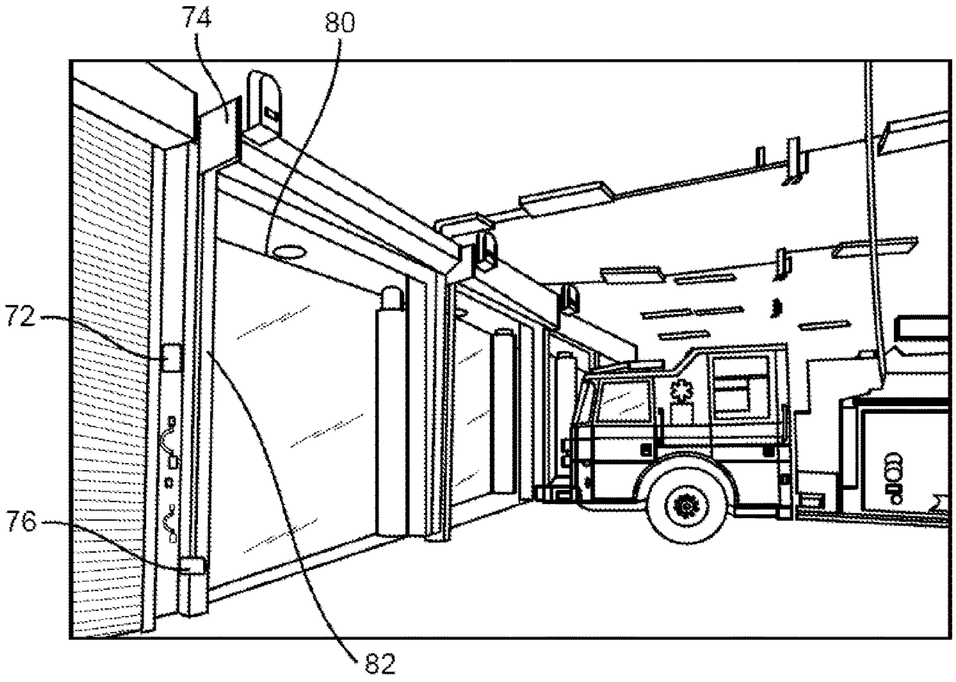
FIG. 3 is a perspective view of a garage door in the open position, having a LED controller and associated light system in a fire station in accordance with the principles of the invention.
Figure 4:
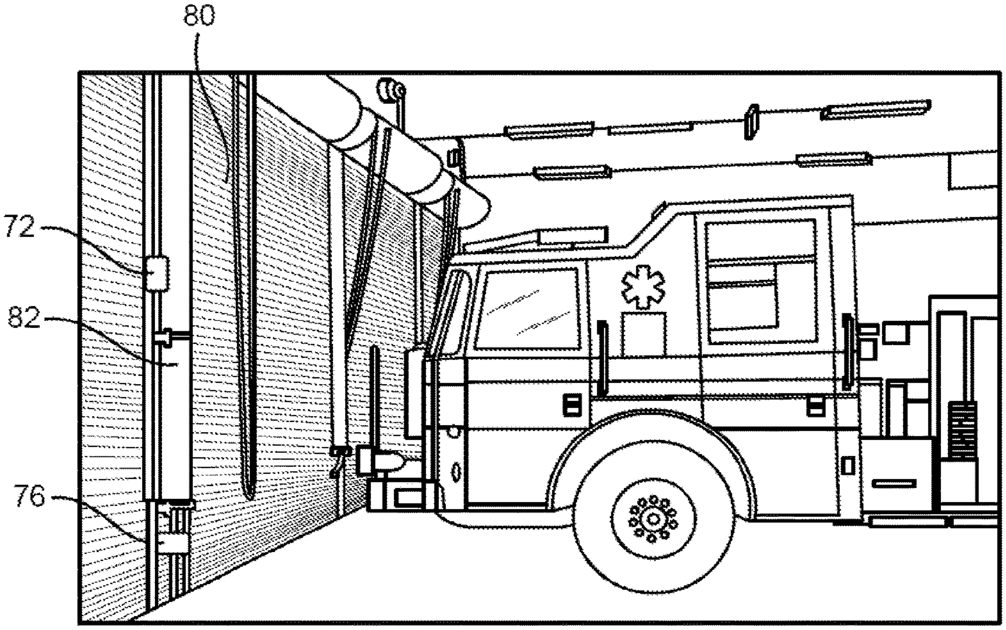
FIG. 4 is a perspective view of a garage door in a closed position, having a LED controller and associated light system in a fire station in accordance with the principles of the invention.

FIGS. 4 and 5 show a firehouse door having LED light systems operated by the LED controller 72 that was configured in the manner described above and shown in FIG. 3, garage door motor 74 and photoelectric eye 76. In FIG. 4, the firehouse garage door 80 is in the open position, and the LED light strip 82 is emitting a solid green light. In FIG. 5, the garage door 80 is in the closed position, and the LED light strip 82 is emitting a solid red.

EXAMPLE 2

In another embodiment, the LED controller is configured using a pre-prepared profile in the configuration tool to function as a vehicle restraint light system. This profile is used to control LED lighting on both the outside and the inside of a garage door and a loading dock. The LED controller receives information at its inputs that signal the position of the garage door and the current status of a dock lock that secures the back of a truck to a loading dock. The LED controller may also optionally be connected to a large monitor or screen that displays the messages in the description column of the table below. Table 3 illustrates the profile used in this embodiment.

TABLE 3

| Door | Dock Lock | Inside Light | Outside Light | Description |
|---|---|---|---|---|
| Not Fully Open | Unlocked | Red | Red | Door is not receiving trucks at this time |
| Fully Open | Unlocked | Red | Green | Door is ready to receive a truck at this time |
| Fully Open | Locked | Green | Flashing Red | It is safe to load or unload the truck at this time |
| Not Fully Open | Locked | Flashing Red | No Change | Warning: lock is engaged while door is not fully opened. Perhaps door-creep. Danger situation. |
| Open or Not | Failed Lock | Flashing Amber | Flashing Red | Warning: lock is not properly engaged. Perhaps the truck does not have a lock bar, or doc-lock was engaged too soon. Danger situation. |

A user may optionally include an additional safety feature, where the LED controller includes instructions that the outside light will not turn green until five seconds after the dock lock is disengaged and it is safe for a truck to drive away. The user may also make any other desired modifications using the configuration tool.

Optionally, a user may also create a profile from scratch, selecting what types of input signals are to be received on each of the input receivers. The user may then select what types of output signals are delivered by each of the output connections. The user may also optionally select whether the LED controller will monitor output voltage drops or other signals indicating a failure in one of the output devices.

EXAMPLE 3

In another embodiment, the LED controller is not limited to controlling LED light systems. The LED controller is much broader than the name suggests. This embodiment is a "system on a module" that functions as a passive listening diagnostic tool that may readily be retrofitted onto existing devices, even devices that existed long before there were computers.

In this embodiment, the controller is placed in line with existing electrical wiring used to power a variety of devices, including photoelectric eyes, motors for raising and lowering garage doors and motors for operating a pivoting gate arm. The controller monitors the voltage, intensity, cycle speed, and periodicity of the electrical currents it passively monitors. This information is utilized to detect problems before they happen. For example, if the controller detects a slowly creeping voltage to a motor, this typically indicates that something is impeding movement of the device operated by the motor. Creeping voltage may therefore be used to send and alerts to a maintenance team to investigate the source of the problem. Similarly, photoelectric eyes typically admit beams of infrared light at regular intervals. If the frequency of the light emissions changes, this may signal an impending failure of the photoelectric eye. Similarly a drastic voltage drop detected in a photoelectric eye may indicate that the photoelectric eye has ceased to function properly and must be replaced or repaired.

The controller may also be designs to learn over time. For example, it may be inserted into existing circuitry to passively monitor the current in a variety of mechanical devices. It may be programmed to identify normal, "healthy" frequencies, currents and periodicities. Once healthy patterns are identified, the controller may then generate alerts when any of these characteristics changes.

In addition, the controller may be modified to include a connection that allows it to upload the information it monitors onto a cloud. Software in the cloud may then be used to analyze the uploaded raw data. The cloud-based software may be connected to several different controllers all monitoring similar systems. When information regarding problems, breakdowns, and maintenance of the monitored systems is Incorporated into the cloud-based software, the entire system may be utilized to identify patterns found in electrical systems prior to different types of failures. This allows the entire system including the cloud-based software to learn over time and increase efficiency of the maintenance of the systems it monitors.

Whereas, the present invention has been described in relation to the drawings attached hereto, other and further modifications, apart from those shown or suggested herein, may be made within the spirit and scope of this invention. Descriptions of the embodiments shown in the drawings should not be construed as limiting or defining the ordinary and plain meanings of the terms of the claims unless such is explicitly indicated.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention claimed is:

1. A light system controller comprising:

a programmable system on a chip;

one or more lighting systems in electrical communication with the system on a chip;

one or more input devices in electrical communication with the system on a chip;

a gate operation profile created by a software configuration tool, compiled into a machine code runtime version, and loaded onto the system on a chip identifying of triggering events and actions to be taken upon the occurrence of the triggering events;

wherein the logic board is remotely connected to a central receiving station.

2. The light system controller of claim 1 further comprising an internet connection and wherein the gate operation profile is installed remotely through the internet connection.

3. A light system controller comprising:

a programmable system on a chip;

one or more lighting systems in electrical communication with the system on a chip;

one or more input devices in electrical communication with the system on a chip;

a gate operation profile created by a software configuration tool, compiled into a machine code runtime version, and loaded onto the system on a chip identifying of triggering events and actions to be taken upon the occurrence of the triggering events; and, a video camera operable by the light system controller.

* * * * *